(12) United States Patent
Mehboob et al.

(10) Patent No.: US 8,897,402 B2
(45) Date of Patent: Nov. 25, 2014

(54) ADAPTIVE IMPULSE NOISE MITIGATION (71) Applicant: Pace Plc, West Yorkshire (GB)

(72) Inventors: Anser Mehboob, Leeds (GB); Li Zhang, Leeds (GB); Javad Khangosstar, Leeds (GB)

(73) Assignee: Pace Plc, Shipley (GB)

( * ) Notice: Subject to any disclaimer, the term of this patent is extended or adjusted under 35 U.S.C. 154(b) by 55 days.

(21) Appl. No.: 13/768,855

(22) Filed: Feb. 15, 2013

(65) Prior Publication Data

US 2013/0208816 A1 Aug. 15, 2013

(30) Foreign Application Priority Data

Feb. 15, 2012 (GB) .................................. 1202571.4

(51) Int. Cl.
*H03D 1/04* (2006.01)
*H04L 27/26* (2006.01)

(52) U.S. Cl.
CPC ........ *H04L 27/2602* (2013.01); *H04L 27/2647* (2013.01)

USPC ......................................................... 375/346

(58) Field of Classification Search
USPC .................. 375/316, 259, 285, 278, 284, 346
See application file for complete search history.

(56) References Cited

U.S. PATENT DOCUMENTS

2002/0188908 A1* 12/2002 Yonge et al. ................... 714/779
2013/0128932 A1* 5/2013 Huang et al. ................... 375/219

* cited by examiner

*Primary Examiner* — Vineeta Panwalkar
(74) *Attorney, Agent, or Firm* — Head, Johnson & Kachigian, P.C.

(57) ABSTRACT

A data transmission system and method is provided for the transmission data signal to one or receiving locations. A Multi Mode Compressive Sensing (MMCS) scheme is provided which adaptively changes the number of pilots used to reconstruct the Impulsive Noise (IN) depending on the IN's current severity so as to mitigate the same and stabilize the Bit Error Rate (BER) of the transmitted data signals and so improve the overall transmission system data throughput. The system can also allow for a variable IN mitigation range in order to allow the concurrent control of the BER and data throughput in the data transmission system.

14 Claims, 7 Drawing Sheets

ADAPTIVE IMPULSE NOISE MITIGATION

CROSS-REFERENCE TO RELATED APPLICATIONS

This application claims priority to United Kingdom Patent Application No. 1202571.4 filed Feb. 15, 2012 which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention to which this application relates is to mitigate impulsive noise (IN) in data transmission systems and particularly, although not necessarily exclusively in Orthogonal Frequency Division Multiplexing (OFDM) systems by using an adaptive system based on compressive sensing (CS).

2. Prior Art

Impulsive noise in multi-carrier systems has been a problem in obtaining reliable data communications over both wireline and wireless networks. Many known systems and methods have been proposed to reduce the effects of IN on performances of OFDM based communication systems in wireless, DSL (Digital Subscriber Line) and Power Line Communication (PLC) systems.

One group of known methods use clipping and/or nulling while another group use iterative methods to estimate time or frequency domain IN and then cancel its effects. Another area of research relates to compressive sensing for IN mitigation and in which attempts have been made to reconstruct the time-domain IN from its partial frequency domain measurements. The measurements can be taken at receiver by placing silent subcarriers in an OFDM frame at a data transmitter before Inverse Discrete Fourier Transform (IDFT) and any sparse time-domain signal e(n)—with the number of non-zero samples equals to T—can be reconstructed with high accuracy from its Discrete Fourier Transform (DFT) $\tilde{e}(k)$ sampled at only M out of N frequencies (where M<N) provided that $M \geq TC \mu \log(N)$. Here, $\mu$ is a coherence parameter and is defined as the maximum inner product between two distinct unit-normed columns of the measurement matrix such as a normalized DFT matrix. In this special case of time-domain IN and frequency-domain measurements, the value of $\mu$ is equal to one with the proportionality constant C tightening the bounds and the number of measurements in frequency-domain IN is equivalent to the number zero-subcarriers deployed to reconstruct time-domain IN.

However in the known works on IN mitigation using CS the sparsity of IN is assumed to be constant and thereby the number of pilots to reconstruct IN is also fixed. However, in practical implementations where the data is to be carried in specific data transmission system such as Power Line Communications (PLC) the sparsity of IN changes significantly over time and this in turn limits the application of traditional CS algorithms as in practical systems the sparsity of IN changes considerably over time such that, for example, there are more IN disturbances in some hours of the day than others. Therefore relying on fixed number of zero-subcarriers may not be suitable in all circumstances in that if the disturbance ratio (number of impulses) of the IN is high, the insufficient frequency-domain measurements (zero-subcarriers) will cause inaccurate IN estimation and thus lead to BER degradation. On the other hand, if the disturbance ratio of IN is low but the number of zero-subcarriers is too high or higher than required, it will lead to wastage of available bandwidth and as a result lowered throughput of data.

The aim of the present invention is therefore to develop a Multi Mode Compressive Sensing (MMCS) scheme that adaptively changes the number of pilots used to reconstruct the IN depending on the IN's current severity so as to stabilise the Bit Error Rate (BER) and improve overall system data throughput. A further aim is to provide a system with a variable IN mitigation range in order to allow the concurrent control of the BER and data throughput in a data transmission system.

BRIEF SUMMARY OF THE INVENTION

In a first aspect of the invention there is provided a method for the mitigation of the effects of Impulsive Noise (IN) in an Orthogonal Frequency Division Multiplexing (OFDM) based data communication system characterised in that said method includes the steps of transmitting a plurality of OFDM frames via said communication system as a signal to one or more receiving locations, identifying a number of impulses occurring with respect to the data signal at that time and/or at a predetermined time and, if the said number of impulses exceeds at least one predefined level, changing the required number of zero-subcarriers used in the data signal in order to reconstruct the IN for the next transmission of OFDM frames.

In one embodiment the estimating of the number of impulses is performed continuously and the method adapted in response thereto.

Typically the method utilises compressive sensing to reconstruct the IN.

Typically, once the IN has been reconstructed, it is subtracted from the received signal in the time domain.

Typically the method is applied to data transmission systems in which the IN sparsity changes variably over time, such as, for example, in Power Line Communications.

Typically the method improves the BER performance significantly as compared to $M_1=32$ zeros-subcarriers scheme and throughput of more than 20% as compared to $M_2=128$ zero-subcarriers scheme.

In a further aspect of the invention there is provided a data transmission method which utilises the Impulsive Noise mitigation method as herein described.

In a yet further aspect of the invention there is provided a data communication system for the transmission of data signals from at least one location to a plurality of receiving locations, said system including means for transmitting data signals including a plurality of OFDM data frames, estimating the number of impulses occurring in the OFDM frames at that time and/or at a predetermined time and, if required, changing the required number of zero-subcarriers used to reconstruct the IN for the next transmission of OFDM frames.

In a yet further aspect of the invention there is provided data communication apparatus at at least one location for receiving data signals transmitted thereto, said apparatus including means to allow the processing of said received data signals, data signal analysis means to allow impulsive Impulsive Noise (IN) mitigation to be performed, said data signal including a plurality of OFDM data frames, the analysis means identifying a number of impulses occurring in the data signal at that time and/or at a predetermined time and, if the number of impulses exceeds at least one predefined level, changing the required number of zero-subcarriers used to reconstruct the IN for the next transmission of OFDM frames.

BRIEF DESCRIPTION OF THE SEVERAL VIEWS OF THE DRAWING(S)

Specific embodiments of the invention are now described with reference to the accompanying diagrams; wherein.

DETAILED DESCRIPTION OF THE INVENTION

In accordance with the invention, there is provided an improved manner to allow the transmission of data signals from at least one broadcast or transmitter location to one or a number of receiving locations. The receiving locations may at spaced locations within the same premises or may be provided in different premises. The transmit or broadcast location may be in the same premises or may be at a remote location. In whichever embodiment the aim is to reduce the impact on the data signals in terms of the errors which may occur in the same and thereby provide a more reliable data transmission system, and hence more reliable service, to the users of the apparatus at the receiving location.

The data which is transmitted may, for example, be provided in order to allow the provision of video, audio and/or auxiliary services at the receiver locations such as for example, the provision television, radio and/or internet services. As such in order for the service provided to be of a sufficient quality there is a need for the errors or the Bit Error Rate (BER) in the data which is transmitted to the receiving locations to be kept to a minimum. The errors can be introduced because of any of problems at the transmission apparatus, problems at the receiving location apparatus and/or problems caused by the transmission medium, whether it be cable or wireless or fibre optic. The present invention provides an adaptive system, apparatus and method which allows the monitoring and adaptation of the transmission of the data signals in order to mitigate the effect of Impulsive Noise on the data transmission and errors which this may cause.

In order to illustrate the method, system and apparatus of the invention and test the same, a Bernoulli-Gaussian model was used to model the invention by generating IN by multiplying a high power white noise with a sequence of 'ones' and 'zeros' generated from the Bernoulli process. The overall noise term on the $m^{th}$ subcarrier, $u_m$, which includes Additive White Gaussian Noise (AWGN) and IN was $$u_m = n_m + b_m g_m, \quad m=0,1,2\ldots N-1 \tag{1}$$

Where m=0, 1, 2 ... N−1 is subcarrier index, $n_m$ is AWGN noise with variance $\sigma^2_n$. The term $b_m$ represents an independent and identically distributed sequence of 'zeros' and 'ones' following Bernoulli process with prob($b_m$=1)=p, and $g_m$ is white Gaussian noise with zero mean and variance $\sigma^2_g$.

The Signal to Noise Ratio was defined as:

$$SNR = \frac{S}{\sigma^2_n} = \frac{E_{sym}R_{sym}}{N_oW} = \frac{E_{sym}}{N_o} \tag{2}$$

Where S, $E_{sym}$, $R_{sym}$, $N_0$ and W define symbol power, symbol energy, symbol rate, noise power spectral density and bandwidth respectively. In the simulations BPSK modulation was used and thus $E_{sym}/N_0 = E_b/N_0$.

Similarly, Impulse to Noise Ratio is defined as:

$$INR = \sigma^2_g/\sigma^2_n.$$

In typical PLC systems, $\sigma^2_g$ is 10 dB to 50 dB higher than $\sigma^2_n$.

The example of an OFDM system which has been used utilises a Binary Phase Shift Keying (BPSK) modulation scheme with the total number of data subcarriers in a frame equal to N−$M_i$ (with i=1, 2 ... L and $M_i$<N). Where, L denotes the number of modes used in the system. The frame is padded with $M_i$ zero-subcarriers to make a complete OFDM frame $\tilde{s}$ of dimension 1×N. The position of the zeros are assumed to be known at the apparatus at the receiver location. The transmitted time domain OFDM vector s can be obtained from frequency domain vector $\tilde{s}^T$ as $$s = \frac{1}{\sqrt{N}} F^H \tilde{s}^T \tag{3}$$

Here, $F^H$ is N×N Inverse Discrete Fourier Transform (IDFT) matrix with $$F_{k,n} = e^{-\frac{j2\pi kn}{N}} \tag{4}$$

For n=0, 1, 2, ... N−1 and k=0, 1, 2, ... N−1

Vector s is appended with a Cyclic Prefix (CP) at the start with lengths equal to the number of channel taps. The CP padded frame is then passed through Digital to Analog conversion (DAC), amplification and transmitted over wireless, DSL or powerline channel using appropriate circuitry. During the transmission, the transmitted frame is subject to channel attenuations and noise impurities including IN and the channel is represented using a discrete-time low pass equivalent model. At the receiver, an N×1 vector x after demodulation, Analog to Digital Converter (ADC), filtering and CP removal takes the form $$x = Hs + u \tag{5}$$

where u=e+n

Here H is the N×N circulant channel matrix whereas vectors n and e represent N×1 AWGN and IN respectively. To estimate the IN vector e in the received vector x the Discrete Fourier Transform (DFT) of x is used and the frequency domain vector is $$\tilde{x} = Fx \tag{6}$$

If there are no channel attenuations and noise effects during the transmission then $\tilde{x} = \tilde{s}^T$ would be obtained. But in the presence of channel attenuations and noise effects (IN plus AWGN), by sampling $\tilde{x}$ in (6) at only those positions corresponding to zero-subcarriers $$\tilde{u}_{M_i} = F_{M_i} \mu \quad (7)$$

is obtained where $\tilde{u}_{M_i}$ is $M_i \times 1$ vector representing the $M_i$ frequency-domain samples on the zero subcarriers. Since the zero-subcarriers don't carry any data—the only information obtained at zero-subcarriers is the partial frequency-domain information of the IN and the AWGN added during the transmission. $F_{M_i}$ is $M_i \times N$ DFT matrix and u is $N \times 1$ vector representing the N-samples IN plus AWGN in time domain. If the added noise were only IN i.e. no AWGN, then equation (7) can be rewritten as $$\tilde{e}_{M_i} = F_{M_i} e \quad (8)$$

The vector $\tilde{e}_{M_i}(M_i \times 1)$ represents $M_i$ samples of IN taken in the frequency-domain while vector $e(N \times 1)$ denotes the N-sample of time-domain IN. Clearly, equation (8) is an underdetermined system with the same dimensions as in equation (7) and has an infinite number of solutions fore. Here, the theory of compressive sensing of equation [6] suggests that any problem in the form of equation (8) i.e. a sufficiently sparse signal e in time-domain can be recovered from its partial frequency-domain signal $\tilde{e}_{M_i}$ using method of convex optimization as in equation [7] and the optimum solution for e can be expressed as $$e_{opt} = \min_e \|e\|_{l1} \text{ s.t } \tilde{e}_{M_i} = F_{M_i} e \quad (9)$$

However, with AWGN in addition to IN as in (7), the problem is essentially estimating an optimum sparse vector e contaminated by n in the form $\tilde{u}_{M_i} = F_{M_i} e + F_{M_i} n$ which can be done by equation [9]

$$e_{cs} = \min_e \frac{1}{2} \|\tilde{u}_{M_i} - F_{M_i} e\|_2^2 + \gamma \|e\|_1 \quad (10)$$

In addition to equation (10), other algorithms can also be found to solve equation (7) but in this case algorithm (10) is used to demonstrate the results in which $\gamma$ is a regularization parameter which is used to control the sparsity of estimated IN. The lower bound for $\gamma$ given in [9] is $$\|F^H(\tilde{u}_{M_i} - \hat{\tilde{u}}_{M_i})\|_\infty \frac{1-(T-1)\mu}{1-(2T-1)\mu} \leq \gamma \quad (11)$$

requires the knowledge of sparsity i.e. T and estimation of $\hat{\tilde{u}}_{M_i}$ which is $l_2$-norm i.e. $\hat{\tilde{u}}_{M_i} = F(F^H F)^{-1} F^H \tilde{u}_{M_i}$ [9]. These two values change over every frame thus not giving stable value of $\gamma$. Therefore the optimum value of $\gamma$ is obtained by subtracting IN estimates from received frames at various values of $\gamma$ and evaluating the resultant BER [14].

Figure 1:
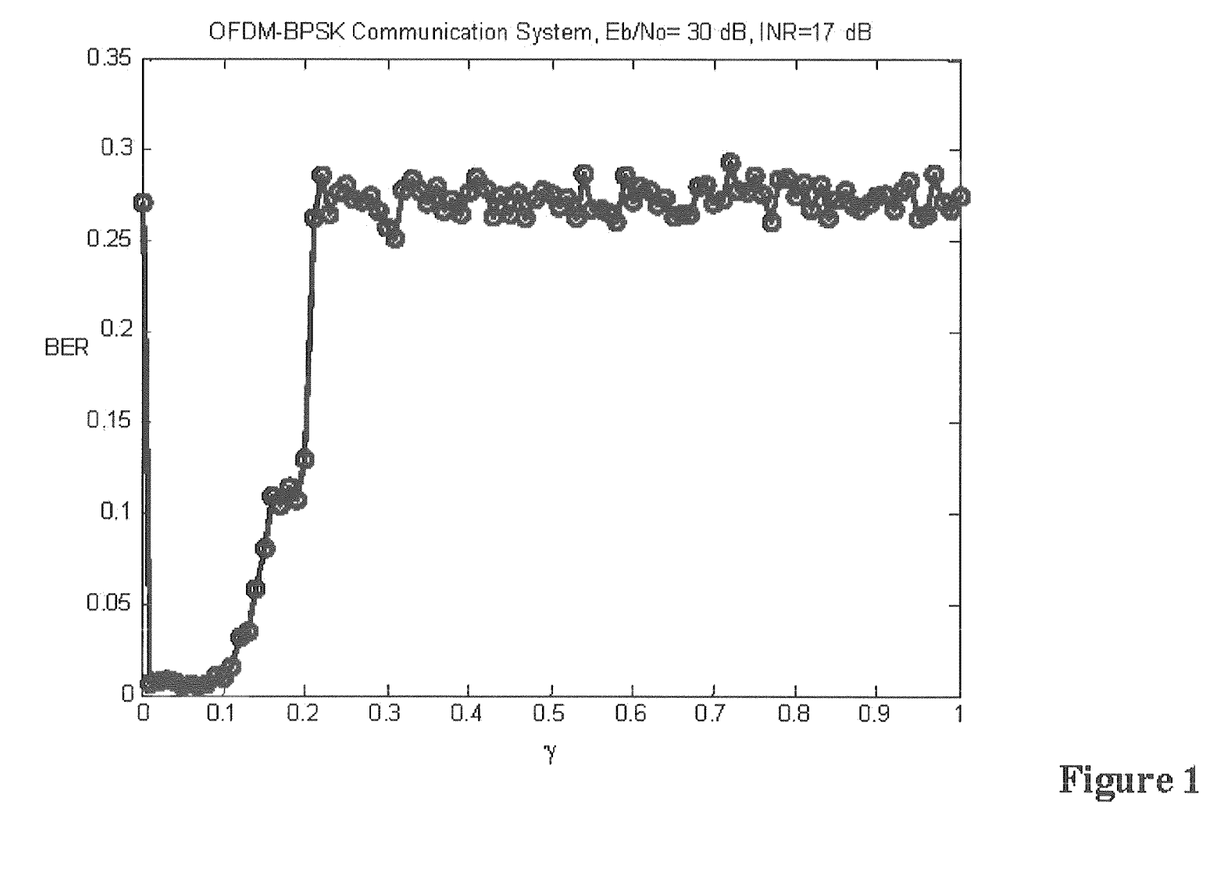
FIG. 1 represents an Optimum value of γ for an algorithm used in the invention.

FIG. 1 shows the BER obtained using (10) at various values of $\gamma$, $E_b/N_o = 30$ dB and INR=17 dB. Clearly, the $\gamma$ value in the range from 0.001 to 0.01 gives the optimum BER so $\gamma = 0.001$ is chosen.

In order to accurately reconstruct IN from its partial frequency-domain measurements, the number of measurements (zero-subcarriers $M_i$) must be greater than or equal to the number of IN's non-zero elements (T) times a constant as shown in equation 12 below in which:

$$M_i \geq TC\mu \log(N), i=1\ldots L \quad (12)$$

Conventionally, $M_i$ is fixed to a constant value as in equations 7 and 11. As shown in equation 12 if T increases one would need to increase $M_i$ for accurate IN reconstruction and consequent BER stabilization. On the contrary, if T decreases one would like to decrease the number of measurements to increase throughput. Therefore, in accordance with the invention a Multi Mode Compressive Sensing (MMCS) method is used to adaptively reconstruct the IN and then subtract it from the received OFDM frame. In MMCS, L sets of pilots are used with increasing lengths equal to M (where i=1, ... L). In our performances evaluation, two cases with L=4 and L=2. are illustrated and this allows the manipulation of the bound as calculated in equation 12. Increasing the number of measurements $M_i$ in equation 12 means an increase in the number of impulses of the detectable IN. Consequently, it is possible to reconstruct and remove the IN with a higher disturbance ratio (i.e. higher number of impulses). This is corroborated by simulating an OFDM system with L=4 different sets of zero-subcarriers of lengths 10, 32, 64 and 128 out of 256 subcarriers OFDM frame. The positions of zero-subcarriers are random in the OFDM frame but known to both transmitter and receiver. The random positioning of zero-subcarriers is similar to randomly selecting the frequencies of IN plus AWGN which is essentially sparse signal recovery in CS literature.

Figure 2:
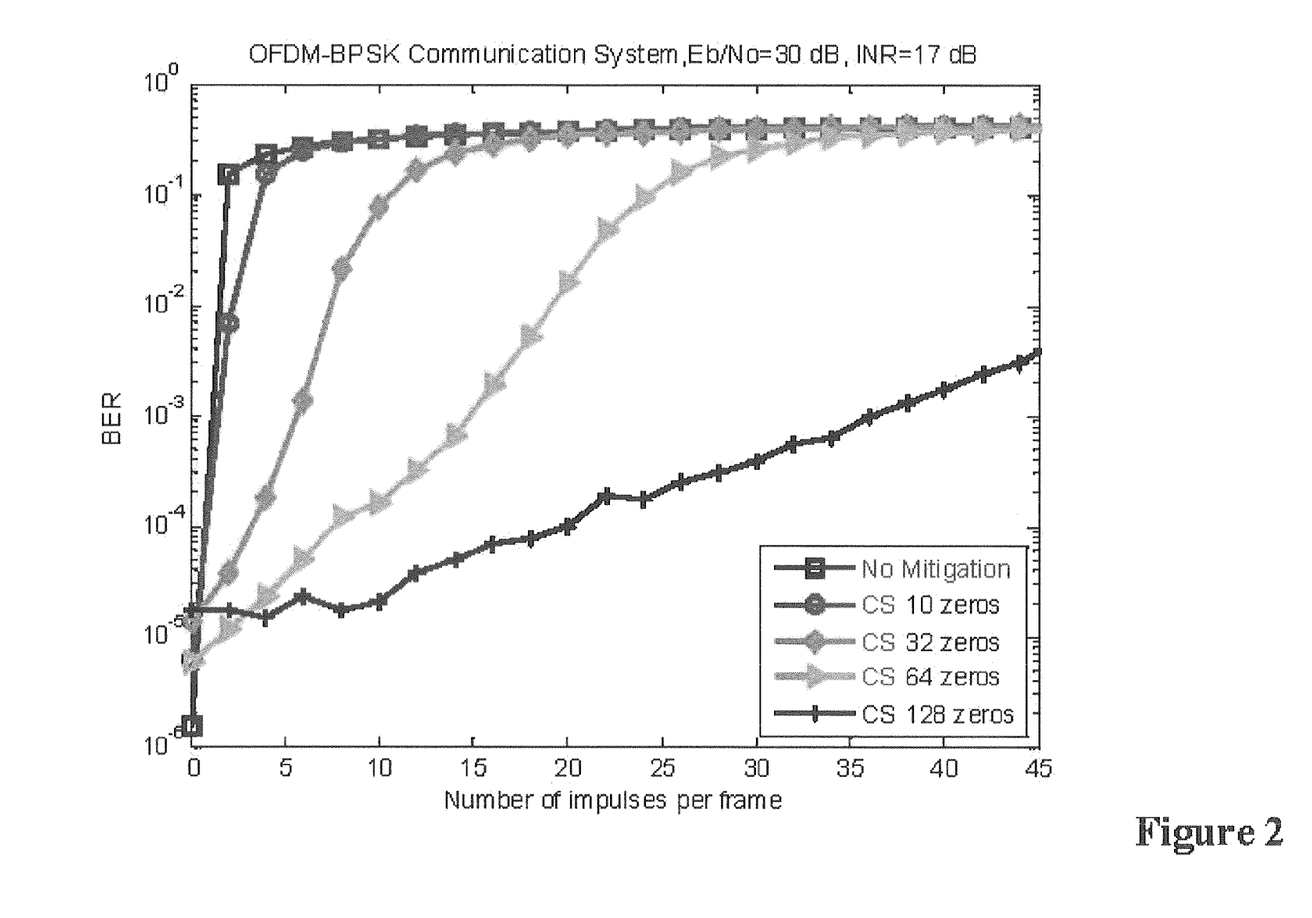
FIG. 2 graphically illustrates the BER vs No. of Impulses performance of various pilots' sets.

The BER performances of different sets of zero-subcarrier against the number of IN impulses per OFDM frame are shown in FIG. 2 where it is observed that with 5 IN impulses in an OFDM frame, IN mitigation using equation 10 with 10-zeros gives a BER of only $10^{-1}$ while with 128-zeros the BER of almost $10^{-5}$ is achieved. The results clearly demonstrate that with an increase in the number of zero-subcarriers, the number of identifiable IN impulses in an OFDM frame also increases.

Figure 3:
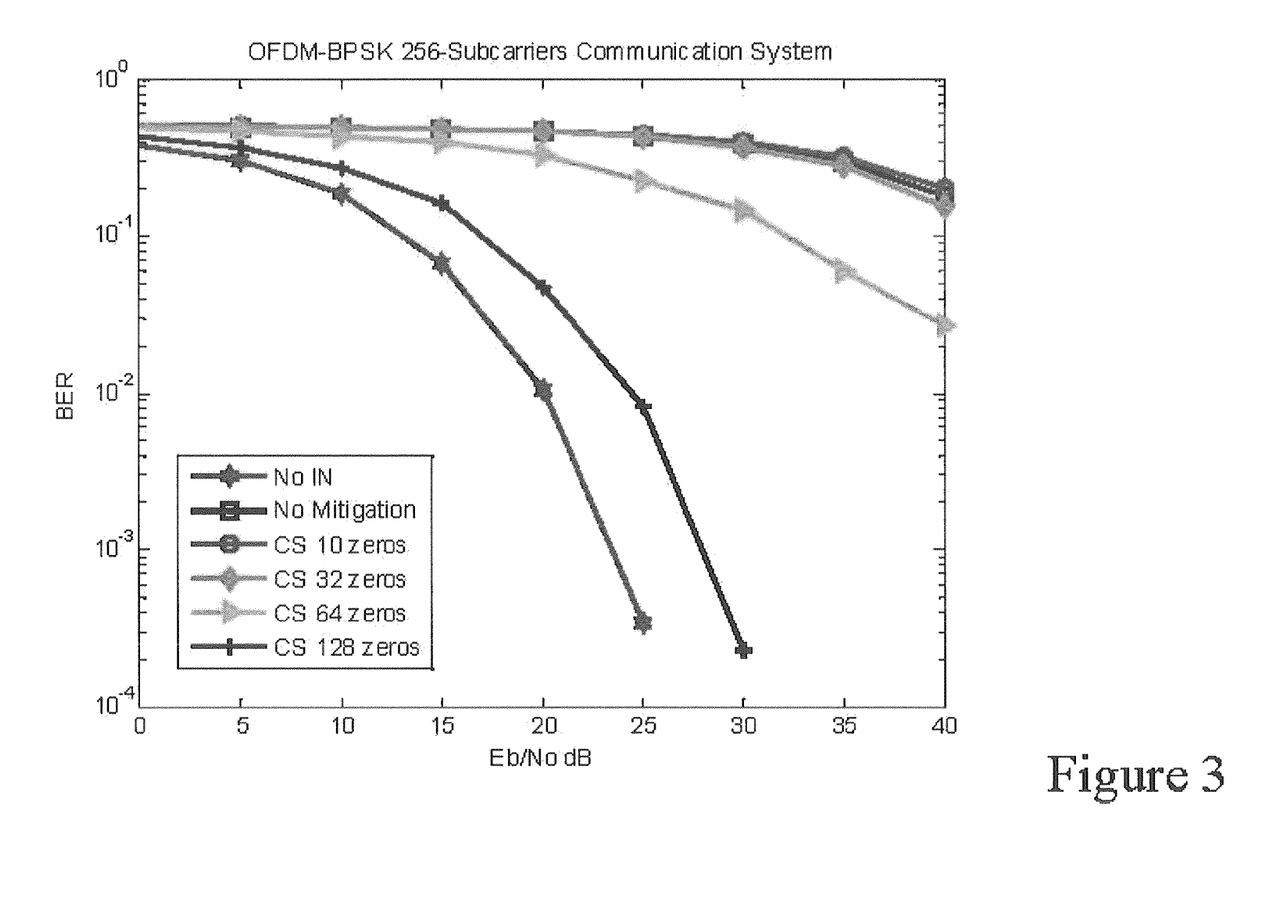
FIG. 3 BER vs $E_b/N_o$ performance of various pilots' sets.

Similarly, BER versus $E_b/N_o$ performance curves of four sets of zeros-subcarriers are shown in FIG. 3. This time, instead of using the number of IN impulses, IN is generated through the model presented in equation 1 with Prob($b_m=1$) =0.1. These performances further authenticate the idea that if the number of zero-subcarriers is increased, the performance of the CS algorithm also improves but at the cost of spectral efficiency (or overall throughput). However, by using the method of the invention in which an increase or decrease of the number of zero-subcarriers is made depending on the current IN disturbance ratio, both the BER and throughput are improved.

In the scenario with a high number of IN samples occurring in OFDM frames, a switch can be made to higher number of pilots to maintain reliable transmission. While, in the cases with fewer IN samples a reduced number of pilots can be used to improve overall throughput. In order to allow this method to operate efficiently an accurate estimate of support is required i.e. indices of IN's non-zero elements in current OFDM frame, denoted as supp($e_{cs}$)=$\hat{I}$. A method which can be used to estimate $\hat{I}$. is set out below.

A. First Stage Support Estimation

1. Sort the $e_{cs}$ from (10) in descending order.
2. Denote the original indices of the largest $M_i/2$ elements of $e_{cs}$ as $I_{M_i/2}$.
3. Select the largest $M_i/2$ elements of $e_{cs}$ as $$\hat{e}_{cs}[n] = \begin{cases} e_{cs}[n], & n \in I_{M_i/2} \\ 0, & \text{Otherwise} \end{cases} \quad (13)$$

4. Estimate the supp($e_{cs}$)=$\hat{I}$ by $$\hat{I} = \{n : e\hat{e}_{cs}[n] \neq 0\}$$

$$n = 0, 1 \ldots N-1 \quad (14)$$

After getting the support estimation, the method of Least Square (LS) is applied to find the optimum amplitudes of reconstructed IN.

$$\hat{e} = \begin{cases} (F_{M_i}^H F_{M_i})^{-1} F_{M_i}^H \tilde{u}_M, & \text{on } \hat{I} \\ 0 & \text{elsewhere} \end{cases} \quad (15)$$

The estimated supp($e_{cs}$)=$\hat{I}$ in (14) has been restricted to only the largest $M_i/2$ samples of $e_{cs}$. In the above procedure it is ensured that only the largest $M_i/2$ samples of IN are detected or, in other words $M_i \geq T \times 2$ (assuming $C\mu \log(N) \approx 2$) and thus keeping the bound of equation 12 is intact to some extent. However, this restriction on the size of the support renders it unusable for updating the number of zero-subcarriers used in MMCS because it is required that it is known if the estimated number of occurred impulses has exceeded $M_i/2$ or not and the estimation of supp($e_{cs}$) in equation 13 and equation 14 doesn't provide sufficient information. Therefore, a second stage estimation is performed as B. Second Stage Support Estimation 1. Sort the $e_{cs}$ from equation (10) in descending order.
2. Denote the original indices of the largest $M_i$ elements of $e_{cs}$ as $I_{M_i}$.
3. Select the largest $M_i$ elements of $e_{cs}$ as $$\hat{e}_{cs1}[n] = \begin{cases} e_{cs}[n], n \in I_{M_i} \\ 0, \text{Otherwise} \end{cases} \quad (16)$$

4. Estimate the supp($e_{cs1}$)=$\hat{I}_1$ by $$\hat{I}_1 = \{n : \hat{e}_{cs1}[n] > \beta A_{avg}\} \quad (17)$$

$$n = 0, 1 \ldots N-1$$

$$A_{avg} = \frac{1}{N} \sum_{n=0}^{N-1} |\hat{e}_{cs1}[n]|$$

This estimation i.e. $|\hat{I}_1|$ (where $\|$ denotes cardinality i.e. number of elements in $\hat{I}_1$) can then be used to update the current set of zero-subcarriers for IN mitigation. The constant $\beta$ used in (17) is just an amplitude control variable and is equal to 3 in all simulations. Only those impulses whose amplitudes are three times greater than the average amplitude of second stage estimated IN are used. The two stage support estimation is essential for the adaptive system to work properly. Since the equation 10 gives a relatively crude estimate of IN with almost all the elements of $e_{cs}$ having non-zero values, the method is firstly restricted to the largest $M_i/2$ samples to make sure that $M_i \geq T \times 2$. In the second stage, the bound is relaxed to identify if there are more impulses which are of significantly high amplitude. If the number of impulses found is more than the algorithm's current capability, then a switch is made to more zero-subcarriers or if the number of impulses found is relatively low and typically below a predefined level, then a switch is made to fewer zero-subcarriers.

Figure 4:
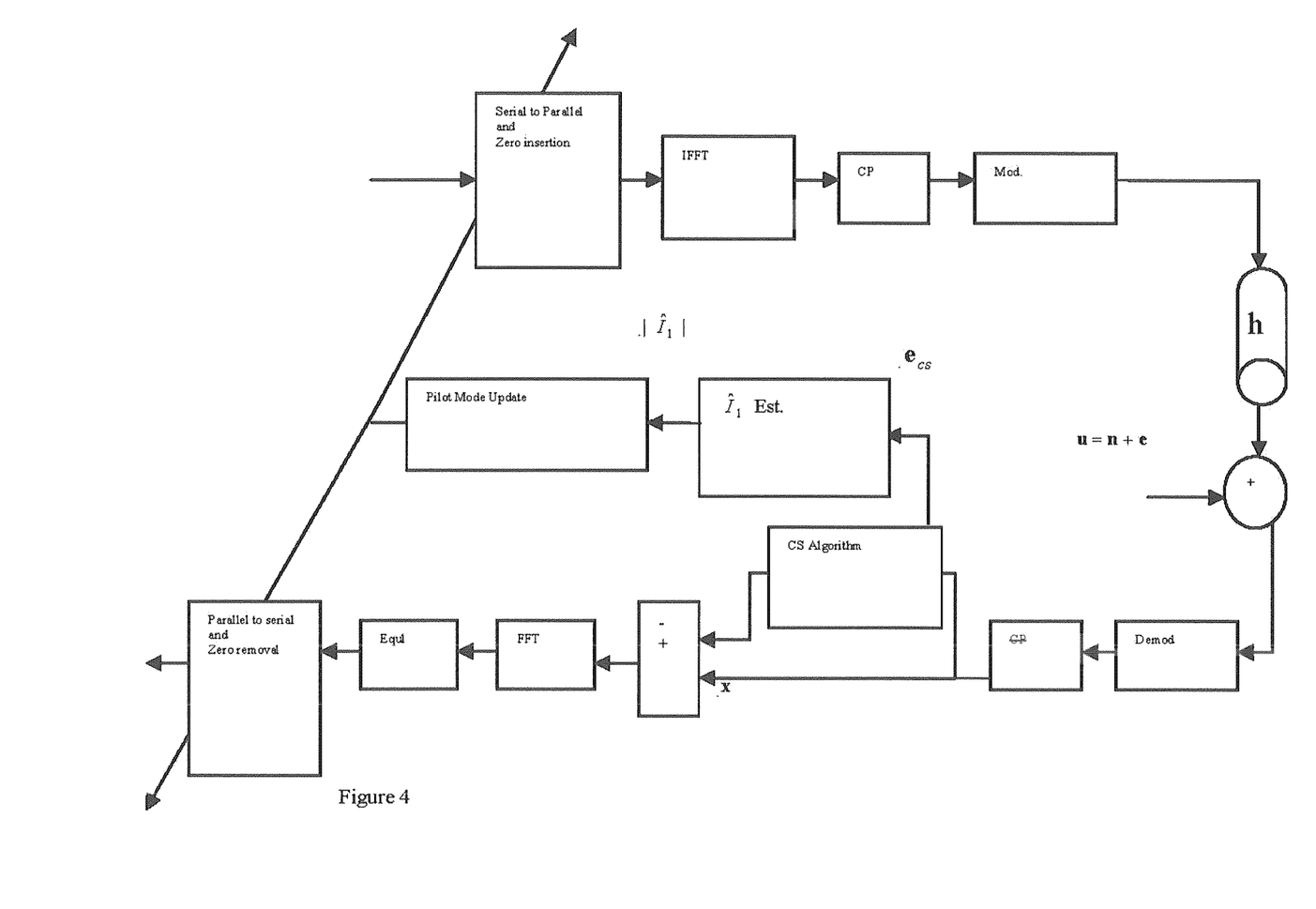
FIG. 4 illustrates in a schematic manner MMCS in OFDM for IN mitigation.

The adaptive method of one embodiment of the invention is shown in FIG. 4. According to compressive sensing theory, to accurately estimate the IN impulses, the number of zero-subcarriers must always be greater than or equal to the number of impulses times a constant i.e. $C\mu \log(N) \approx 2$. In this case, as there is provided an estimate of the current number of impulses (i.e. $|\hat{I}_1|$), then if there are more impulses occurring than the required zero-subcarriers, the number of zero-subcarriers can be increased or vice versa. The estimated IN ($\hat{e}$) is finally subtracted from the received OFDM frame (x) as shown in FIG. 4.

The system shown in FIG. 4 has been simulated with a total number of subcarriers N=256 and L=2 sets of zero-subcarriers i.e. $M_1$=32 zeros and $M_2$=128 zeros. The system switches between the two modes $M_1$ and $M_2$ in a 'Pilot Mode Update' block of FIG. 4 according to the support estimate $|\hat{I}_1|$ i.e.

$$M_i = \begin{cases} i = 1, |\hat{I}_1| \leq 8 \\ i = 2, \text{Otherwise} \end{cases} \quad (18)$$

Figure 5:
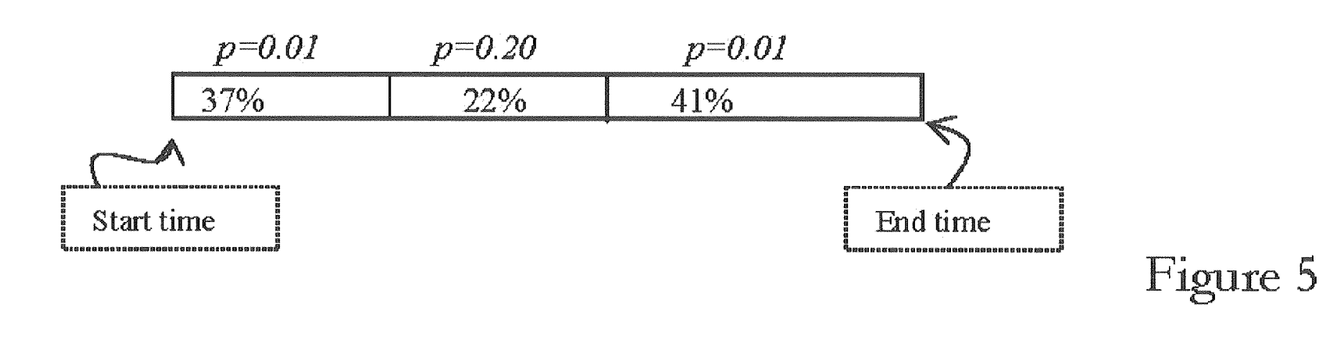
FIG. 5 illustrates the IN probability of occurrence.

The IN is generated at varying sparsity levels by changing Prob($b_m$=1)=p in equation 1. The overall simulation cycle at a particular value of $E_b/N_o$ has been divided into three phases with p equals to 0.01, 0.2 and 0.01 respectively as shown in FIG. 5.

By changing the probability of impulse occurrence from 0.01 to 0.2 and then back to 0.01, the varying nature of IN can be modelled which commonly occurs in practical communication systems such as that shown in FIG. 8 such as powerline communication (PLC) systems. Thus, when Prob($b_m$=1) increases, the MMCS system of the invention also adapts to the change and increases the number of zero-subcarriers and when the Prob($b_m$=1) comes back to normal, the system also decreases the number of zero-subcarriers.

Figure 6:
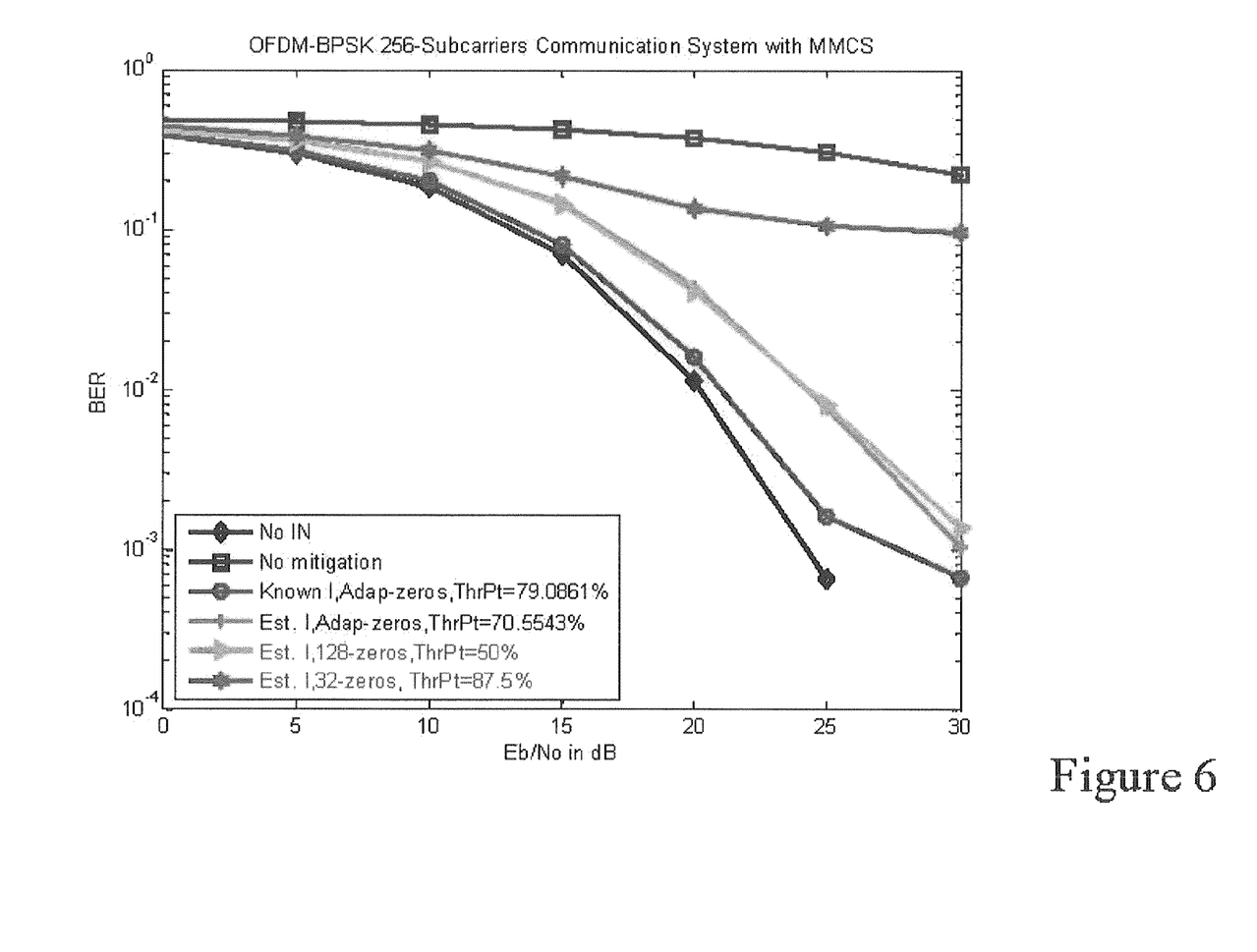
FIG. 6 illustrates graphically the BER performances of different MMCS schemes.

In the BER performance evaluations scenarios with 'no IN' and 'IN with no mitigation' have been used to represent the two extreme possibilities in terms of BER performances for the purpose of comparison. FIG. 6 shows the BER vs $E_b/N_o$ performance results of MMCS as compared to the conventional fixed-pilots schemes and in which the overall throughput of the system as the percentage of subcarriers used only for data transmission is illustrated. The closest BER performance to 'No IN' case using MMCS in accordance with the invention is obtained when there is a-priori knowledge of supp(e)—as shown in FIG. 6. When a-priori knowledge of supp(e) is not available, the supports estimates are utilised i.e. $\hat{I}$ and $\hat{I}_1$. It is evident from FIG. 6 that the use of the MMCS method with estimated supports gives almost the same BER performance as one would get with 128 pilots. However, MMCS provides a throughput of 70.55% which greatly improves over the 50% throughput provided by the fixed 128 pilots (i.e. 128 out of 256 subcarriers containing no information). Similarly, if the BER performance of MMCS is compared with the scheme having fixed 32-zeros; it is found that although the throughput of 32-zeros scheme is 87.5% the BER performance of the 32-zeros scheme is not comparable and thus could not be practically used in this scenario. Note that the throughput for MMCS with estimated support in accordance with the invention is slightly lower than the MMCS with known support in accordance with the invention.

This is because with the known support the 'Pilot Mode Update' in FIG. 4 is highly accurate.

Figure 7:
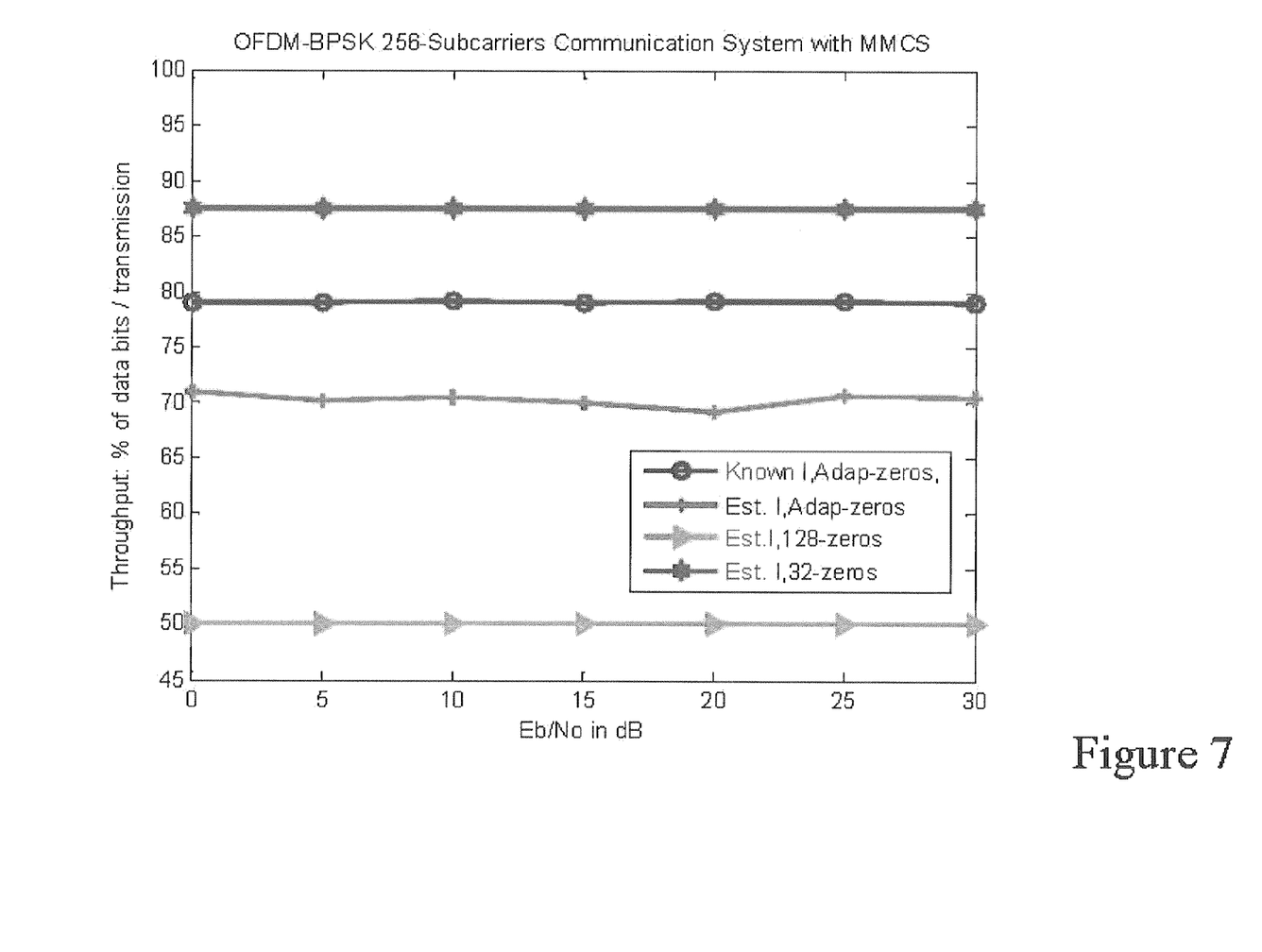
FIG. 7 illustrates throughput results for different MMCS schemes

Furthermore, the results shown in FIG. 7 also confirm that MMCS retains the overall throughput around 70% while maintaining the BER performance almost equal to that of the 128-zeros scheme which only provides a throughput equal to 50%. This gives an improvement of more than 20% in overall throughput.

The current invention therefore provides a flexible system which allows the autonomous changing of the number of zero-subcarriers according to the IN disturbance ratio at that time and hence is adaptive and flexible in response to the IN sparsity. There is provided an MMCS system which adaptively changes the number of zero-subcarriers according to the number of impulses occurring per OFDM frame and also designs different sets of zero-subcarriers of varying lengths, estimating the number of impulses occurring per OFDM frame and appropriately choosing a pilot set for the next transmission. In addition, the feedback process enables the system to adaptively change the number of zero-subcarriers according to the disturbance ratio of IN.

The invention claimed is:

1. A method for the mitigation of the effects of Impulsive Noise (IN) in an Orthogonal Frequency Division Multiplexing (OFDM) based data communication system characterised in that said method includes the steps of:

transmitting a plurality of OFDM frames via said data communication system as a signal to one or more receiving locations, identifying a number of impulses occurring with respect to the data signal at a first time and/or at a predetermined time and, if the said number of impulses exceeds at least one predefined level, changing a required number of zero-subcarriers used in the data signal in order to reconstruct the IN for the next transmission of OFDM frames, wherein the method is applied to the data communication system in which the IN sparsity changes variably over time.

2. A method according to claim 1 wherein the step of identifying the number of impulses is performed continuously and the number of zero-subcarriers used is adapted in response thereto.

3. A method according to claim 1 wherein the method utilises compressive sensing to reconstruct the IN.

4. A method according to claim 1 wherein once the IN has been reconstructed, it is subtracted from the data signal in the time domain.

5. A method according to claim 4 wherein the IN is subtracted from each received OFDM frame.

6. A method according to claim 1 wherein the data communication system is a Power Line Communication (PLC) system.

7. A method according to claim 1 wherein an increase or decrease of the number of zero-subcarriers is made depending on the IN disturbance ratio at that time.

8. A method according to claim 1 wherein an estimation of the number of impulses is performed as a two stage process including a first stage in which the method is restricted to the largest $M_i/2$ samples to ensure that $M_i \leq T \times 2$ and a second stage in which the said restriction is relaxed, wherein Mi is the number of zero-subcarriers and T is the number of non-zero samples.

9. A method according to claim 1 wherein if the number of impulses is greater than a predefined level, an increase in the number of zero-subcarriers is performed.

10. A method according to claim 1 wherein if the number of impulses is below a predefined level a reduction in the number of zero-subcarriers is performed.

11. A method according to claim 1 wherein the identification of the number of impulses is represented by an estimated value.

12. A data transmission method which utilises the method for mitigation of claim 1.

13. A data communication system for the transmission of data signals from at least one location to a plurality of receiving locations, said system comprising:

a transmitter for transmitting data signals including a plurality of OFDM data frames, estimating the number of impulses occurring in the OFDM frames at a first time and/or at a predetermined time and, if required, changing a required number of zero-subcarriers used to reconstruct the IN for the next transmission of OFDM frames, wherein the sparsity of the IN of the data communication system changes variably over time.

14. Data communication apparatus at at least one location for receiving data signals transmitted thereto, said apparatus comprising:

a processor to allow the processing of said received data signals, a data signal analyser to allow Impulsive Noise (IN) mitigation to be performed, said received data signals including a plurality of OFDM data frames, the data signal analyser identifying a number of impulses occurring in the received data signal at a first time and/or at a predetermined time and, if the number of impulses exceeds at least one predefined level, changing a required number of zero-subcarriers used to reconstruct the IN for the next transmission of OFDM frames, wherein the sparsity of the IN changes variably over time.

* * * * *